United States Patent [19]

Da Silva

[11] 4,337,782
[45] Jul. 6, 1982

[54] CORN AND CEREAL THRASHER

[75] Inventor: Jose T. Da Silva, Ribeirao Preto, Brazil

[73] Assignee: Cia Penha de Maquinas Agricolas-Copemag, Sao Paulo, Brazil

[21] Appl. No.: 266,215

[22] Filed: May 22, 1981

[51] Int. Cl.³ .............................................. A01D 9/00
[52] U.S. Cl. ..................................... 130/30 E; 130/6; 130/27 HF; 130/30 R
[58] Field of Search ................ 130/6, 7, 8, 9 R, 9 A, 130/9 B, 9 C, 9 D, 9 E, 9 F, 27 H, 27 HF, 27 HA, 30 R, 30 B, 30 E, 30 F, 30 K, 27 R, 27 T

[56] References Cited

U.S. PATENT DOCUMENTS

| | | | |
|---|---|---|---|
| 1,374,518 | 4/1921 | Oda | 130/27 HF |
| 2,931,362 | 4/1960 | Carlson | 130/6 |
| 3,631,861 | 1/1972 | Skahill | 130/6 |
| 3,844,293 | 10/1974 | Young | 130/6 |
| 4,159,023 | 6/1979 | Todd et al. | 130/27 T |
| 4,185,642 | 1/1980 | Ridgway | 130/30 E |

Primary Examiner—Robert A. Hafer
Attorney, Agent, or Firm—Robert E. Burns; Emmanuel J. Lobato; Bruce L. Adams

[57] ABSTRACT

A corn and cereal thrasher comprises a cylindrical screen in a vertical casing with an annular space between the screen and the casing. A rotor rotatable concentrically inside the screen comprises successively, from the lower end, a helical screw portion for raising grain to be thrashed, thrashing loops and thrashing blades for thrashing grain raised by the screw and projecting it out through the screen, and a radial fan at the top for raising straw and chaff and discharging them through an opening in the casing. Grain to be thrashed is fed to the screw through an opening at one side near the bottom and the thrashed grain is deflected by an inclined plate to an opening on the opposite side of the casing.

4 Claims, 6 Drawing Figures

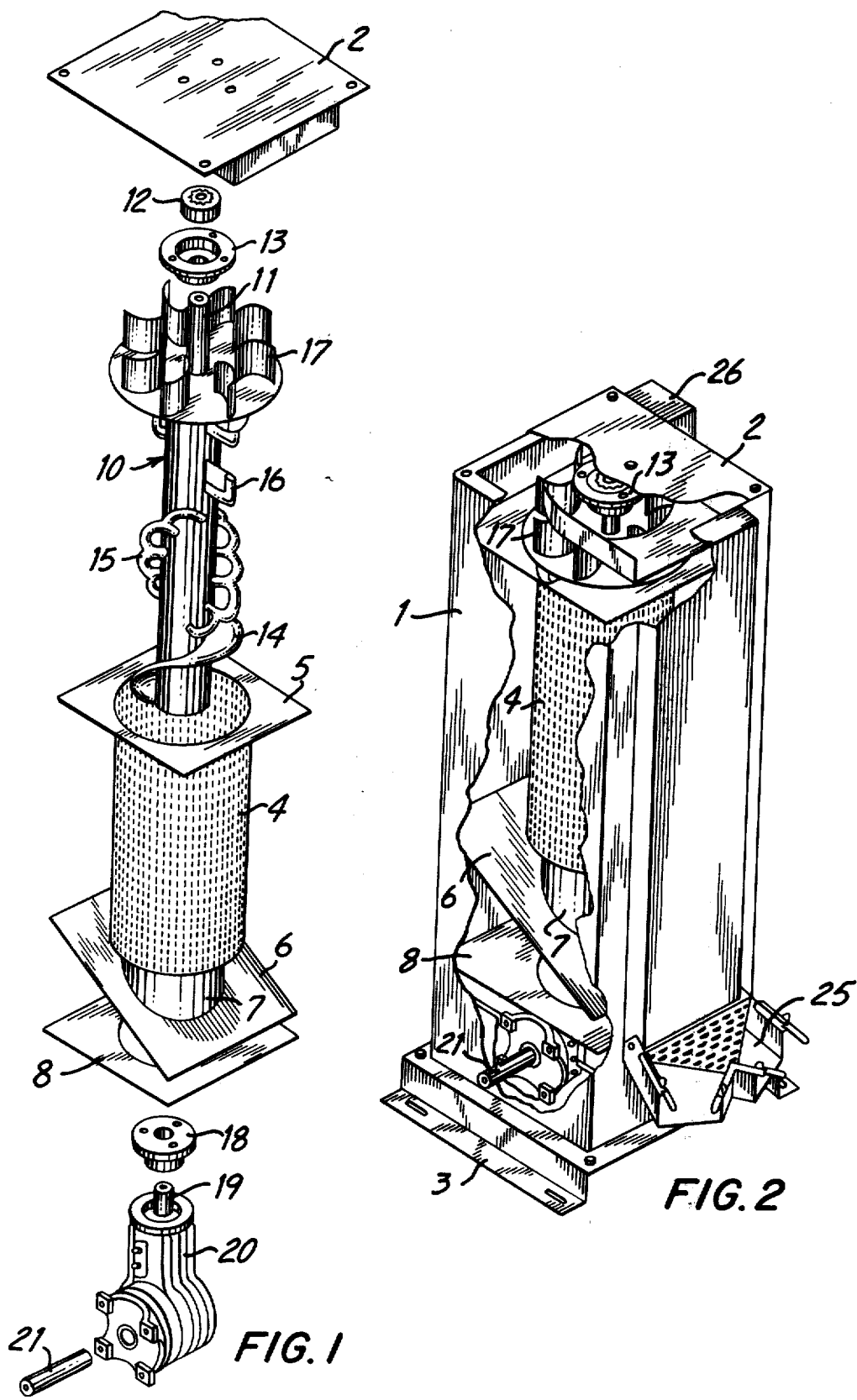

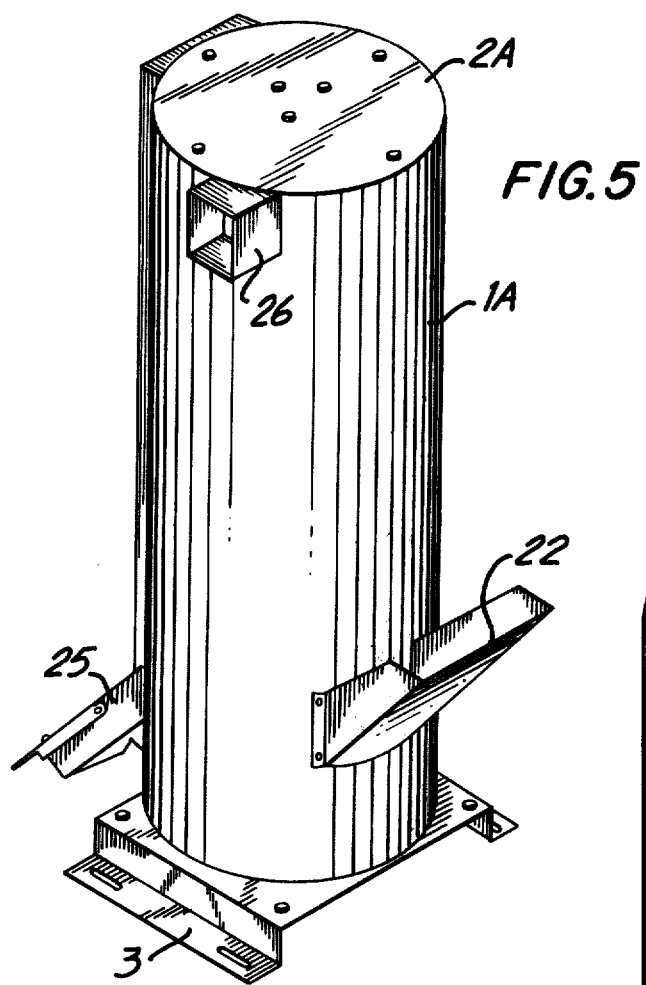
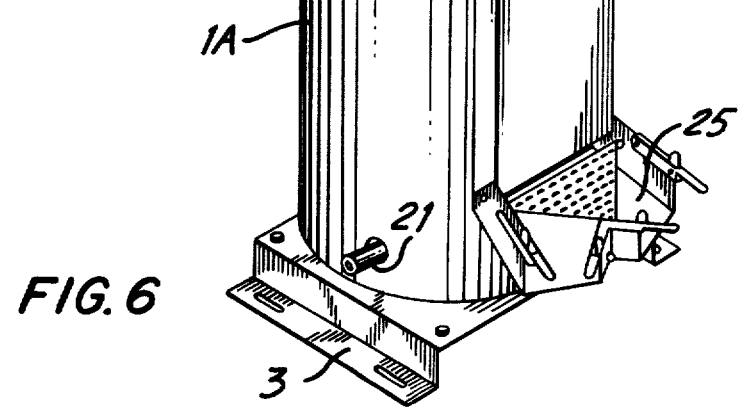

CORN AND CEREAL THRASHER

FIELD OF THE INVENTION

The present invention relates to a vertical thrasher for wheat, oats, rye, barley and other grains, the term grain being herein used in a generic sense to include all small grains to be removed from hulls, stems or stalks.

BACKGROUND OF THE INVENTION

Most equipment presently available for thrashing grain is large and expensive and requires a considerable amount of power to drive it. It is hence not appropriate for use by farmers or others who have relatively small amounts of grain to be thrashed and need equipment that is not only less expensive but also smaller so that it can be accommodated in limited space.

SUMMARY OF THE INVENTION

The present invention provides a vertical thrasher for cereals and small grain which is of a versatile nature, can be easily transported and occupies only a very small space. It is ideal for thrashing on a small scale and can easily be connected or disconnected to any available power source such as the power take-off of a tractor or small electric or internal combustion motor. It is eminently suitable for individual rather than industrial use. A single rotor rotating on a vertical axis provides helicoidal transport vanes, thrashing loops or hooks and blades and a radial fan all of which complete the function of the assembly.

BRIEF DESCRIPTION OF DRAWINGS

The nature, object and advantages of the invention will be more fully understood from the following description of a preferred embodiment shown by way of example in the accompanying drawings in which:

FIG. 1 is an exploded view of the internal components of a vertical thrasher in accordance with the invention;

FIG. 2 is a perspective view with portions of the outer casing or housing broken away to show the internal construction;

FIGS. 5 and 6 are perspective views similar to FIGS. 3 and 4 but showing a thrasher with a circular rather than a square casing.

DESCRIPTION OF PREFERRED EMBODIMENTS

Figure 3:
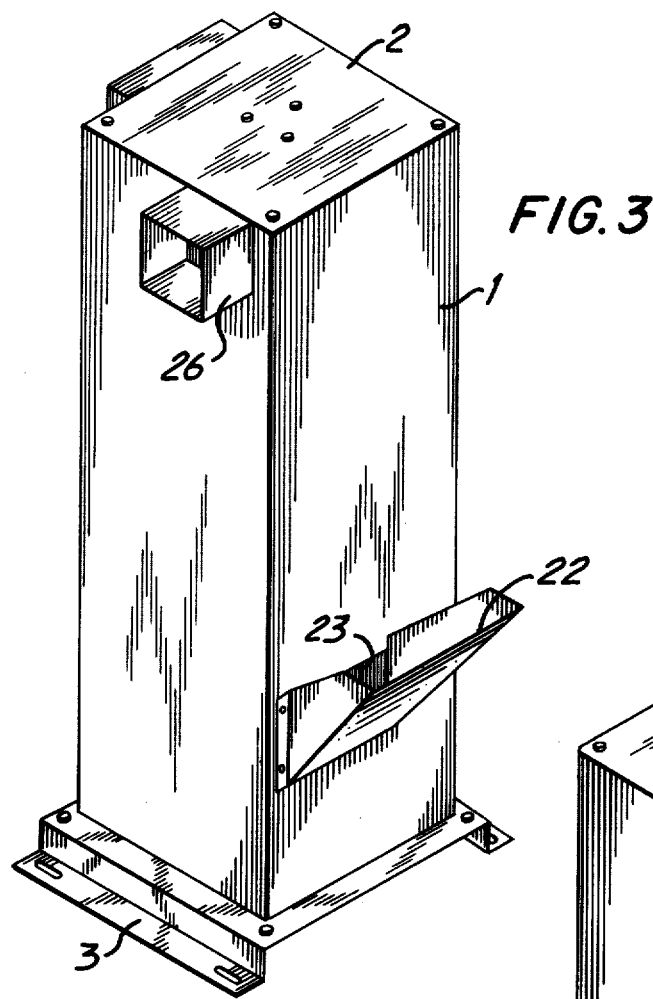
FIG. 3 is a perspective view from one side of the thrasher.
Figure 4:
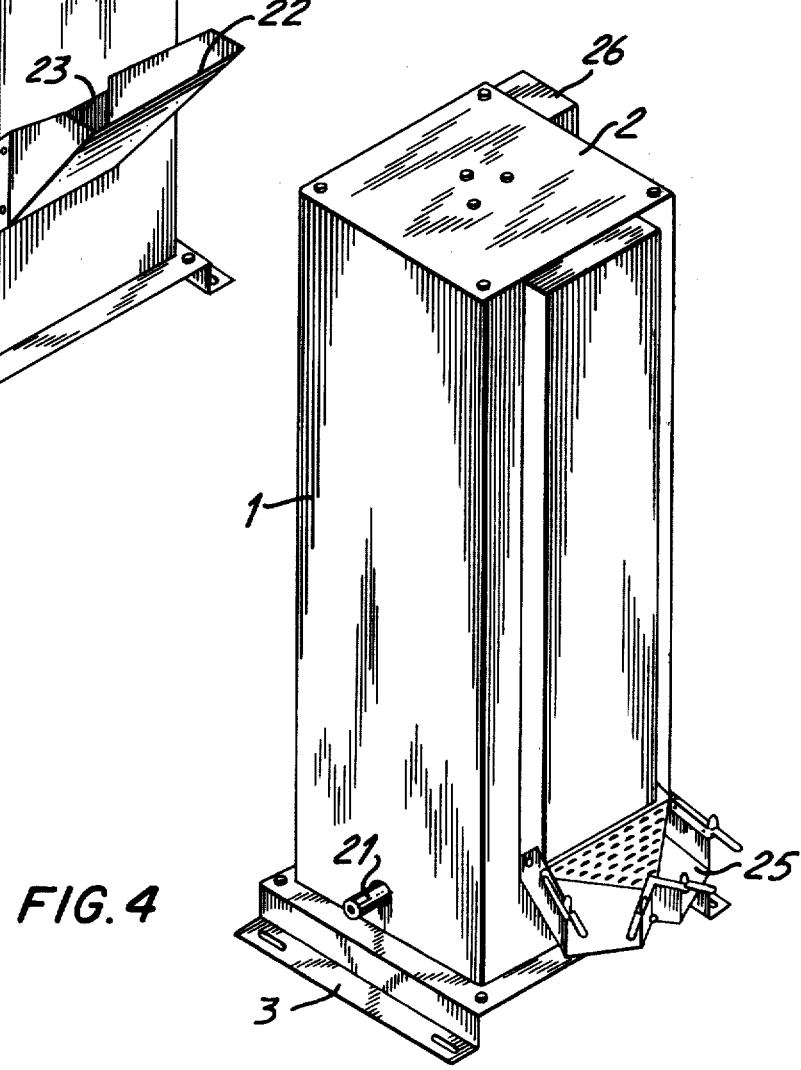
FIG. 4 is a perspective view from the opposite side of the thrasher.

In FIGS. 1 to 4 there is shown a vertical thrasher having a square casing or housing 1 provided with a removable cover 2 and mounted on a base 3. The housing, cover and base can conveniently be formed of sheet metal. Inside the housing there is a cylindrical screen 4 formed, for example, of perforated sheet metal or woven wire. The diameter of the cylindrical screen 4 is less than the transverse dimension of the housing 1 so that there is a space between the cylindrical screen and the housing. At the upper end of the cylindrical screen 4 there is a square top plate 5 which fits inside the housing. At the lower end of the cylindrical screen 4 there is a rectangular plate 6 which likewise fits inside the housing and is inclined downwardly to one side of the housing. A crescent-shaped imperforate collar 7 is provided at the lower end of the cylindrical screen 4 so as to accommodate the inclination of the plate 6. Alternatively, the cylindrical screen 4 can be extended down to the inclined plate 6 in which event the lower end of the cylindrical screen is correspondingly inclined. Below the inclined plate 6 there is a horizontal plate 8.

Inside the cylindrical screen 4 there is a rotor 10 comprising a shaft 11 which is rotatably supported at its upper end by a bearing 12 in a fitting 13 secured to the lower face of the cover 2. Proceeding from the bottom to the top, the rotor 10 comprises a helical screw blade 14, thrashing hooks 15, thrashing blades 15 and a radial fan 17. The thrashing hooks 15 as seen in FIG. 1 comprise loops which extend radially and are disposed in a helical arrangement. The thrashing blades 16 extend radially of the rotor. The screw blade 14, thrashing hooks 15 and thrashing blades 16 are disposed inside the helical screen 4. The radial fan 17 is located above the cylindrical screen. The rotor is coaxial with the cylindrical screen 4. At its lower end the rotor is supported by a bushing 18 and is coupled with the output shaft 19 of a right angle transmission and rotation multiplier 20 having a horizontal input shaft 21. The shaft 21 is connected to a stationary motor or to the drive shaft of a tractor.

Grain to be thrashed is fed to the thrasher by means of a downwardly inclined chute 22 leading to an opening 23 which opens into the housing below the inclined plate 6 so as to feed the grain to the lower portion of the helical screw 14. The grain is elevated by the helical screw 14 and by the updraft of the radial fan 5 to the thrashing hooks 15 and thrashing blades 16. The rapidly rotating thrashing hooks 15 and thrashing blades 16 loosen the grains and project them radially outwardly by centrifugal force against the cylindrical screen 4. The grains together with small light waste passes through the perforations of the screen. In the free space between the screen and the housing 1, the grains fall to the bottom because of their weight while the light waste is sucked up by the radial fan 5. The grains fall down onto the inclined plate 6 which directs them to an opening in the housing and a downwardly inclined spout 25 from which the grain flows into appropriate bags, bins or other recepticles.

The strip, stalks, leaves and light waste are sucked up by the radial fan 17 and discharged through an opening 26 in one side of the housing near the top. The waste material can thus be discharged either into a suitable receptacle or into a duct leading to a disposal zone.

In FIGS. 5 and 6 there is shown another embodiment of the invention in which the housing 1A is round instead of square and is accordingly provided with a round top or cover 2A. At the side of the housing on which the discharge spout 25 is located, there is provided a vertically extending projection of the housing which contributes to collecting the thrashed grain and discharge it through the spout 25. The embodiment shown in FIGS. 5 and 6 is otherwise like that shown in FIGS. 1 to 4 and described above.

While preferred embodiments of the invention have been illustrated in the drawings and are herein particularly described, it will be understood that variations and modifications can be made and that the invention is not limited to the illustrated embodiments.

What is claimed is:

1. A corn and cereal thrasher comprising:
a vertical casing, a cylindrical screen in said casing with a space between said screen and said casing, a rotor in said cylindrical screen and coaxial therewith, said rotor comprising from bottom to top a helicoidal elevator portion, thrashing loops, thrashing blades and a radial fan, means for driving said rotor, an inclined plate at the lower end of said cylindrical screen and a horizontal plate below said inclined plate with a space therebetween, an input chute at one side of said casing opening into said space between said horizontal plate and said inclined plate, a discharge chute at the opposite side of said casing to receive and discharge grain passing through said cylindrical screen into said space between said screen and said casing, and a discharge opening in an upper portion of said casing for discharge of air from said radial fan together with chaff and other light waste.

2. A corn and cereal thrasher according to claim 1, in which said rotor comprises a vertical shaft which is supported by bearings at the top and bottom of said casing and on which said elevator portion, thrashing hooks, thrashing blade and radial fan are disposed.

3. A corn and cereal thrasher according to claim 2, in which said drive means for said rotor comprises a right angle drive at the lower end of said vertical shaft with a horizontal drive shaft extending out through said casing.

4. A corn and cereal thrasher according to claim 1, in which said thrashing hooks comprise a series of loops arranged in a helix.

* * * * *